June 19, 1923.  1,459,323
J. S. DE MARTINI ET AL
AUTOMOBILE BUMPER
Filed April 3, 1922
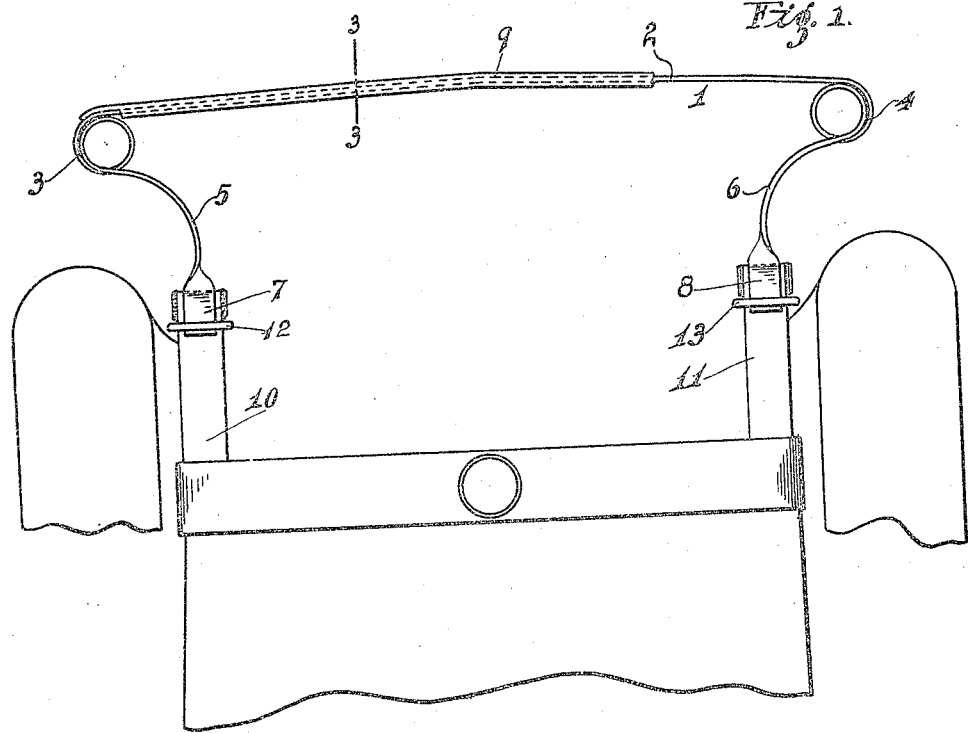
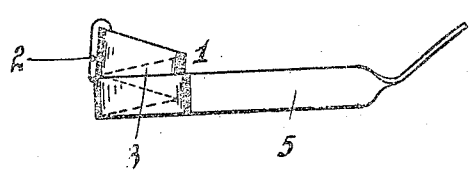
Inventor
Joseph S. DeMartini.
John W. DeMartini.
By Harry Schnoelz
Attorney Patented June 19, 1923.

1,459,323

UNITED STATES PATENT OFFICE.

JOSEPH S. DE MARTINI AND JOHN W. DE MARTINI, OF SAN FRANCISCO, CALIFORNIA.

AUTOMOBILE BUMPER.

Application filed April 3, 1922. Serial No. 549,105.

*To all whom it may concern:*

Be it known that we, JOSEPH S. DE MARTINI and JOHN W. DE MARTINI, citizens of the United States, residing at San Francisco, in the county of San Francisco and State of California, have invented certain new and useful Improvements in Automobile Bumpers, of which the following is a specification.

Our invention is an improved bumper for automobiles which is constructed of a single bar of spring steel shaped to give it the desired resilience to effectively absorb the shocks of the impacts thereagainst and thus relieve the automobile of such shocks.

Referring to the annexed drawing in which our invention is illustrated and which forms a part of this specification:

Figure 1 is a plan view of our bumper attached to the forward part of an automobile.

Figure 2 is a side view of our bumper.

Figure 3 is a cross section of our bumper taken on line 3—3 of Fig. 1.

In the drawing 1 indicates a single bar of spring steel, bent into a forwardly convexed bumper member 2, into spiral spring coils 3 and 4 from the ends respectively of said bumper member and into curved spring connecting members 5 and 6 extending inwardly and rearwardly from said coils respectively, and twisted at their ends at right angles to said spring members into securing members 7 and 8. A strip of black rubber 9 is vulcanized to the forward side of the bumper member 2 and over the lower and upper edges of said member to prevent tearing, denting or scuffing any object struck by our bumper.

The bumper is mounted on the front of the automobile by means of the securing members 7 and 8 which are secured on the forward ends of the front springs 10 and 11 of the automobile by straps 12 and 13 respectively. The spring coils 3 and 4 effectively absorb the shock of the impact of the bumper member 2 against an object and when released rebound back into shape and bring the bumper member back into its normal position.

Having described our invention, we claim:

A bumper for a motor vehicle comprising a single bar of spring metal, said bar being curved forwardly and bent into a spring coil at each side of the bumper, and connecting members extending from the coils to the ends of the bar, said connecting members being twisted approximately 90° near their ends forming securing members, said connecting members being curved from the coils to the securing members and a strip of resilient material extending throughout the length of the front portion of the bumper and nearly enclosing said portion.

In testimony whereof we affix our signatures.

JOSEPH S. DE MARTINI.
JOHN W. DE MARTINI.